United States Patent
Greenberger

(10) Patent No.: US 10,831,822 B2
(45) Date of Patent: Nov. 10, 2020

(54) METADATA BASED TARGETED NOTIFICATIONS

(71) Applicant: International Business Machines Corporation, Armonk, NY (US)

(72) Inventor: Jeremy A. Greenberger, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 15/427,159

(22) Filed: Feb. 8, 2017

(65) Prior Publication Data

US 2018/0225296 A1 Aug. 9, 2018

(51) Int. Cl.
*G06F 16/58* (2019.01)
*G06Q 30/02* (2012.01)
(Continued)

(52) U.S. Cl.
CPC ..... *G06F 16/5866* (2019.01); *G06Q 30/0252* (2013.01); *G06Q 30/0255* (2013.01);
(Continued)

(58) Field of Classification Search
CPC .. G06F 16/9535; G06F 16/951; G06F 16/958; G06F 16/338; G06F 16/954; G06F 2216/15; G06F 21/10; H04N 21/4828; H04N 21/812; G06Q 50/01; G06Q 10/0633; G06Q 10/103; G06Q 30/0241; G06Q 10/063; G06Q 10/063114; G06Q 10/087; G06Q 10/10; G06Q 10/1095; G06Q 10/20; G06Q 20/10; G06Q 20/12; G06Q 30/0201; G06Q 30/0222; G06Q 30/0239; G06Q 30/0255; G06Q 30/0269; G06Q 30/06;
(Continued)

(56) References Cited

U.S. PATENT DOCUMENTS 6,653,976 B1 11/2003 Janky
7,474,959 B2 1/2009 Singh
(Continued)

FOREIGN PATENT DOCUMENTS

EP 2767845 A1 8/2014
WO 2014204463 A1 12/2014

OTHER PUBLICATIONS

Graham et al., "Time as Essence for Photo Browsing Through Personal Digital Libraries", JCDL'02, Jul. 13-17, 2002, Portland, Oregon, USA. Copyright 2002 ACM 1-58113-513-0/02/0007, 10 pages.
(Continued)

*Primary Examiner* — Chinyere Mpamugo
(74) *Attorney, Agent, or Firm* — William H. Hartwell

(57) ABSTRACT

A method includes, determining a portion of metadata of a media file associated with a first user matches a portion of metadata search parameters, wherein the metadata search parameters are associated with sending targeted notifications. Identifying, a targeted notification to send the first user based at least on the portion of the metadata of the media file matching the portion of the metadata search parameters. The method sends, the targeted notification to the first user, wherein the targeted notification is viewable on the first user's electronic device.

20 Claims, 6 Drawing Sheets

(51) Int. Cl.
*H04N 5/765* (2006.01)
*H04N 5/44* (2011.01)
*H04N 9/82* (2006.01)
*H04N 21/482* (2011.01)
*H04N 21/2743* (2011.01)

(52) U.S. Cl.
CPC ........... *H04N 5/4401* (2013.01); *H04N 5/765* (2013.01); *H04N 9/8205* (2013.01); *H04N 21/2743* (2013.01); *H04N 21/4828* (2013.01)

(58) Field of Classification Search
CPC ........... G06Q 30/0601; G06Q 30/0619; G06Q 30/0633; G06Q 50/12; G06Q 10/02; G06Q 30/0207–0277; H04L 67/10; H04L 67/02; H04L 65/1069; H04L 69/329
See application file for complete search history.

(56) References Cited

U.S. PATENT DOCUMENTS

| | | | |
|---|---|---|---|
| 7,765,184 B2 | 7/2010 | Makela | |
| 7,924,149 B2 | 4/2011 | Mendelson | |
| 7,933,895 B2 | 4/2011 | Amjadi | |
| 8,099,109 B2 | 1/2012 | Altman | |
| 8,334,901 B1 | 12/2012 | Ganick et al. | |
| 8,768,693 B2 | 7/2014 | Somekh | |
| 8,781,502 B1 | 7/2014 | Middleton | |
| 8,996,305 B2 | 3/2015 | Kesar | |
| 9,058,611 B2 | 6/2015 | Saunders et al. | |
| 9,161,168 B2 | 10/2015 | Trantow | |
| 9,183,557 B2 | 11/2015 | Patwa et al. | |
| 9,330,421 B2 | 5/2016 | Heddleston | |
| 9,483,875 B2 | 11/2016 | Theimer | |
| 9,615,347 B1 | 4/2017 | Kerr | |
| 9,622,046 B2 | 4/2017 | Otis | |
| 9,626,697 B2 | 4/2017 | Nevid | |
| 9,641,969 B2 | 5/2017 | Theurer | |
| 9,661,260 B2 | 5/2017 | Turbin | |
| 2007/0067290 A1* | 3/2007 | Makela | G06F 16/487 |
| 2008/0021710 A1* | 1/2008 | Ho | G06F 16/7844 704/270.1 |
| 2008/0033921 A1* | 2/2008 | Arrouye | G06F 16/907 |
| 2008/0249859 A1* | 10/2008 | Angell | G06Q 30/02 705/14.39 |
| 2010/0023399 A1 | 1/2010 | Sahni et al. | |
| 2010/0153008 A1 | 6/2010 | Schwartz | |
| 2010/0194896 A1 | 8/2010 | Heimendinger | |
| 2010/0312609 A1 | 12/2010 | Epshtein et al. | |
| 2011/0016398 A1 | 1/2011 | Hanes | |
| 2011/0044563 A1 | 2/2011 | Blose | |
| 2011/0071911 A1 | 3/2011 | Tung et al. | |
| 2011/0189980 A1 | 8/2011 | Proulx et al. | |
| 2012/0008876 A1 | 1/2012 | Poetker et al. | |
| 2012/0115512 A1 | 5/2012 | Grainger | |
| 2012/0124461 A1 | 5/2012 | Barnett et al. | |
| 2012/0200740 A1 | 8/2012 | Gum | |
| 2012/0250951 A1 | 10/2012 | Chen | |
| 2014/0019264 A1 | 1/2014 | Wachman et al. | |
| 2014/0207578 A1 | 7/2014 | Doughty et al. | |
| 2014/0258271 A1 | 9/2014 | Kong et al. | |
| 2015/0052165 A1 | 2/2015 | Sauve et al. | |
| 2015/0073885 A1 | 3/2015 | Feiz-Ekbatani | |
| 2015/0116541 A1 | 4/2015 | Gilman | |
| 2015/0140982 A1 | 5/2015 | Postrel | |
| 2015/0248439 A1 | 9/2015 | Ratnakar | |
| 2015/0256899 A1 | 9/2015 | Chand et al. | |
| 2015/0269638 A1 | 9/2015 | Chatterton | |
| 2016/0042364 A1* | 2/2016 | Zamer | G06Q 30/0201 705/7.29 |
| 2016/0085865 A1 | 3/2016 | Weingarten et al. | |
| 2016/0110659 A1 | 4/2016 | Skeen et al. | |
| 2016/0125473 A1 | 5/2016 | Singh | |
| 2016/0253691 A1 | 9/2016 | Dante, III | |
| 2017/0161810 A1 | 6/2017 | Nair | |
| 2017/0164316 A1 | 6/2017 | Prendergast | |

OTHER PUBLICATIONS

Greenberger, Jeremy, "Micro-Location Based Photograph Metadata", U.S. Appl. No. 15/071,404, filed Mar. 16, 2016, 24 pages.
Mell et al., "The NIST Definition of Cloud Computing", The National Institute of Standards and Technology, U.S. Department of Commerce, Special Publication 800-145, Sep. 2011, 7 pages.
Nigul, Leho, "Segmenting Mobile Shoppers", U.S. Appl. No. 15/099,652, filed Apr. 15, 2016, 38 pages.
Wang et al., "Argo: Intelligent Advertising by Mining a User's Interest from His Photo Collections", ADKDD'09, Jun. 28, 2009, Paris, France. Copyright 2009 ACM 978-1-60558-671-7, 9 pages.
"Photo Metadata", IPTC, <https://iptc.org/standards/photo-metadata/>, © 2017 International Press Telecommunications Council, printed Feb. 2, 2017, 4 pages.
IBM Appendix P, list of patents or patent applications treated as related, Feb. 6, 2017, 2 pages.
IBM, Appendix P, List of IBM Patents or Patent Applications Treated as Related, dated Apr. 21, 2017, 2 pages.
Chen et al. "Image based information access for mobile phones", IEEE, International workshop on Content-Based Multimedia Indexing (CBMI) Jun. 23-25, 2010, pp. 1-5.
"E-Commerce Customer Segmentation", Forte Wares, White Paper, May 5, 2015, Nine pages. <https://forteconsultancy.wordpress.com/2015/05/05/e-commerce-customer-segmentation/>.
Greenberger, Jeremy A., "Micro-Location Based Photograph Metadata", U.S. Appl. No. 16/546,552, filed Aug. 21, 2019, 27 pages.
IBM, "List of IBM Patents or Patent Applications Treated as Related", Appendix P, 2 pages, dated Aug. 22, 2019.

* cited by examiner

METADATA BASED TARGETED NOTIFICATIONS

BACKGROUND OF THE INVENTION

The present invention relates generally to the field of photograph metadata, and more particularly to integrating photograph metadata based on micro-locations for targeted notifications.

Photograph metadata is data that has been written into a digital photograph file. Multiple photographic metadata standards exist and each include different sets of data written to the photograph. Data written to the photographs may include, but is not limited to, an owner of the photograph, copyright information, contact information for the photograph owner, a camera serial number, exposure information, date and time the photograph was taken and GPS location indicating where the photograph was taken. In some instances, photograph metadata is searchable. In these instances, users can use photograph metadata, after the photograph is taken, to identify features of the photograph.

SUMMARY

According to one embodiment of the present invention, a method, computer program product, and computer system for adding photograph metadata based on micro-locations of a venue is provided. A computer implemented method includes determining, by one or more processors, a portion of metadata of a media file associated with a first user matches a portion of metadata search parameters, in which the metadata search parameters are associated with sending targeted notifications. Identifying, by one or more processors, a targeted notification to send the first user based at least on the portion of the metadata of the media file matching the portion of the metadata search parameters, and sending, by one or more processors, the targeted notification to the first user, such that the targeted notification is viewable on an electronic device associated with the first user.

DETAILED DESCRIPTION

Figure 1:
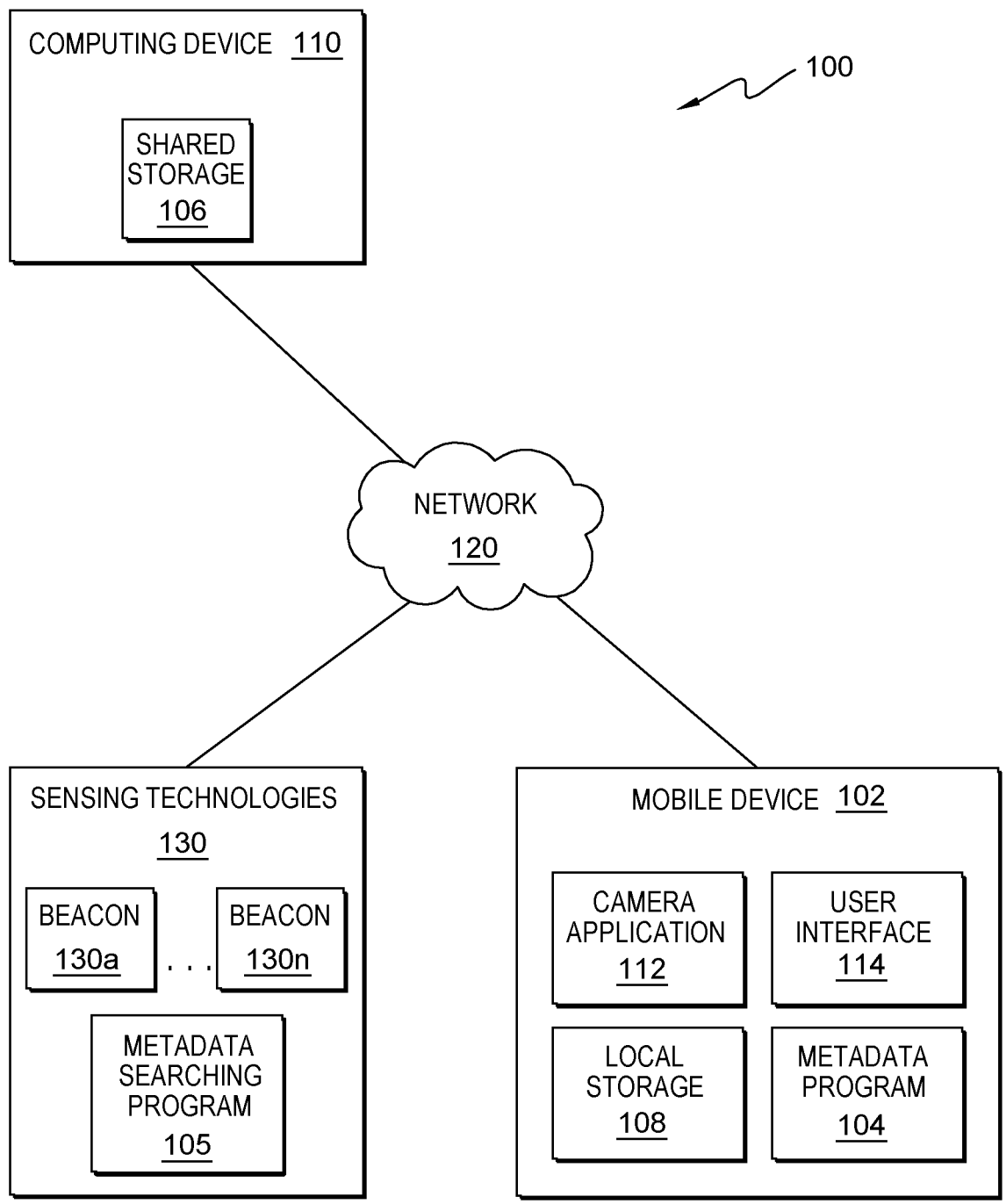
FIG. 1 is a functional block diagram illustrating a computing environment, in accordance with an embodiment of the present invention.

Embodiments of the present invention recognize that metadata information is often associated with photographs. Furthermore, embodiments of the present invention recognize that metadata information adds value to a photograph, because the metadata information is searchable, allowing a user to identify a photograph based on information stored in the metadata. For example, metadata information may include location information, in which a user searches for a location (e.g., Paris) to find all photographs in the user's collection that were taken in Paris. Embodiments of the present inventions recognize that such search features are currently limited to macro-locations. For example, often, location metadata is limited to latitude and longitude coordinates. However, embodiments of the present invention improve the previously limited macro-location metadata tags, and have the ability to provide searchable metadata for photographs based on micro-locations. For example, instead of simply tagging a user's photograph with a general location (e.g., Los Angeles), embodiments of the present invention have the ability to tag a user's location more precisely (i.e., micro-location). In some scenarios this micro-location information further includes location information that is associated with a known location within a particular venue. For example, a user attends a baseball game in a city, instead of just tagging the photo with the name of the city, the micro-location metadata tags the stadium name and the seat the user sat in (e.g., XYZ Baseball Stadium, Seat 13, Row A).

Embodiments of the present invention use micro-location sensing technologies 130 to add location-based metadata to the photograph. Location-based metadata includes a physical location, weather at the location, events that happened at the time of the photograph, history of the location, etc. Additionally, the ability to provide micro-location metadata improves the accuracy of a location of a user that is reported/detected by a mobile computing device associated with that user. The present invention provides micro-location metadata, via micro-location sensing technologies 130, improves the art of metadata tagging. Further, the present invention improves a least one general function of computing systems. One such example of an improvement to the functioning of a computing system includes a reduction in the overall computational overhead for locating data. In this particular improvement, the computing system increases search accuracy by leveraging the micro-location data, which ultimately reduces the computational overhead needed to identify the desired, i.e. searched for, data. In some scenarios, the metadata tagging of pictures, images, videos, files, and or any form of "taggable" data known in the art, enables metadata program 104 to conduct a more thorough search using a user's, or multiple users, metadata. For example, the computing system is able to locate desired information using fewer searches and/or computational overhead since the more precise micro-location information allows certain search results to be filtered out. Thus, returned search results have a higher probability of containing information that is being searched for.

The present invention will now be described in detail with reference to the Figures. FIG. 1 is a functional block diagram illustrating a computing environment, generally designated 100, in accordance with an embodiment of the present invention. Computing environment 100 includes mobile device 102, computing device 110, and sensing technologies 130 connected over network 120. Mobile device 102 includes metadata program 104, local storage 108, camera application 112, and user interface 114.

In various embodiments, mobile device 102 can be a standalone device, a laptop computer, a tablet computer, a netbook computer, a personal computer (PC), a smart phone, a desktop computer, a smart television, a smart watch, or any combination thereof. Mobile device 102 has photograph taking capabilities (i.e., a camera). In another embodiment, mobile device 102 represents a computing system utilizing clustered computers and components to act as a single pool of seamless resources. In general, mobile device 102 can be any computing device or a combination of devices with access to some or all of computing device 110 and sensing technologies 130 via network 120, and with access to and/or capable of executing camera application 112 and metadata program 104. Mobile device 102 may include internal and external hardware components, as depicted and described in further detail with respect to FIG. 4.

In this exemplary embodiment, metadata program 104, camera application 112, and user interface 114 are stored on mobile device 102. In other embodiments, some or all of metadata program 104, camera application 112, and user interface 114 may reside on another computing device, provided that each can access and is accessible by sensing technologies 130, computing device 110, and each other. In yet other embodiments, some or all of metadata program 104, camera application 112, and user interface 114 may be stored externally and accessed through a communication network, such as network 120. Network 120 can be, for example, a local area network (LAN), a wide area network (WAN) such as the Internet, or a combination of the two, and may include wired, cloud computing nodes 10, wireless, fiber optic or any other connection known in the art. In general, network 120 can be any combination of connections and protocols that will support communications between computing device 110, sensing technologies 130, and mobile device 102, in accordance with some embodiments of the present invention.

Metadata program 104 accesses data corresponding to a location or micro-location and populates a photograph's metadata with relevant information. In some embodiments, relevant information can include a micro-location, nearby population of people, an event that happened proximate to the time the photograph was taken (e.g., retrieved by a news or data feed), event information (e.g., time, type of event, event participants, etc.), or advertisements. In some embodiments, a micro-location is a user's location within a venue during a particular event type. In some embodiments, a micro-location is represented on a map of the venue. In another embodiment, coordinates established by the venue represent the micro-location. For example, an aisle, a row, a seat, a room, of a stadium or concert hall. For example, a user's macro-location may be the GPS coordinates for a store and the user's micro-location may be the aisle of the store. Metadata added to photographs by metadata program 104 is searchable by a user and other metadata searching programs. For example, in instances in which the metadata adds event information, a piece of metadata can include a team name. In this example, a user can search photographs using a search term that includes the team name to recall team photographs taken at the event. In an alternative embodiment, not depicted in FIG. 1, metadata program 104 may be stored within computing device 110, and accessible to mobile device 102 via network 120.

Metadata program 104 has the ability to locate and access metadata associated with a user and or data corresponding to a location or micro-location, and distribute a notification to users with relevant associated metadata. In some embodiments of the present invention, metadata associated with a user can be any metadata created and/or stored on the user's mobile device, such as mobile device 102, or on cloud-based storage. In addition to micro-location tagging, metadata program 104 can tag photos with various amount of information including the content of the photo, date, time, purpose, cost, and any other form of metadata know in the art. In other embodiments, metadata program 104 can automatically read, distinguish, tag a user's photos, videos, images, and or files. In some embodiments, relevant associated metadata can be any metadata associated with a user that matches a metadata search, and can include a micro-location, an event that happened proximate to the time the photograph was taken (e.g., retrieved by a news or data feed), event information (e.g., time, type of event, event participants, etc.), or advertisements (e.g., promotional offers, coupons, etc.). For example, a department store can distribute advertisement to an upcoming shoe sale, solely to users who have metadata pertaining to shoes.

Camera application 112 operates to take photographs using a camera attached to the mobile device. Further, camera application 112 communicates with metadata program 104 to populate the photograph with location specific metadata based on GPS data. In other embodiments, location specific metadata can be based on IP address, physical address, and or any location information known in the art. in some embodiments, the user interacts with camera application 112 via user interface 114 to select what metadata is added to the photograph.

Mobile device 102 includes a user interface (UI) 114, which executes locally on mobile device 102 and operates to provide a UI to a user of mobile device 102. User interface 114 further operates to receive user input from a user via the provided user interface, thereby enabling the user to interact with mobile device 102. In one embodiment, user interface 114 provides a user interface that enables a user of mobile device 102 to interact with metadata program 104. In various examples, the user interacts with camera application 112 in order to take a photograph using a camera of mobile device 102 and populate the photograph with metadata. In one embodiment, camera application 112 adds basic metadata, such as time, date, and location, and metadata program 104 enables further addition of more detailed metadata and editing of metadata added by camera application 112. In various example, the user interacts with metadata program 104 in order to determine relevant metadata and control the type of metadata that is populated for photographs. In one embodiment, user interface 114 is integrated in mobile device 102. In other embodiments, user interface 114 is stored on another computing device (e.g., computing device 110), provided that user interface 114 can access and is accessible by at least camera application 112 and metadata program 104.

Local storage 108 can be a data repository that may be written to and read by one or combination of metadata program 104, sensing technologies 130, camera application 112, and one or more mobile device 102 or computing device 110 such as mobile device 102, connected via network 120. Photographs, media files, and associated metadata may be stored on shared storage 106 housed within computing device 110 and/or stored on local storage 108 housed within mobile device 102. Further, micro-location information may be stored on shared storage 106. In some embodiments, local storage 108 may be written to and read by programs and entities outside of computing environment 100 in order to populate the repository with data corresponding to the location, micro-locations, metadata searching or events occurring at the location. For example, A user of computing device 110 can conduct a regional, nationwide, and or global metadata search using metadata searching program 105 to search the metadata stored on local storage 108 housed within mobile devices 102.

In various embodiments of the present invention, computing device 110 can be a laptop computer, a tablet computer, a netbook computer, a personal computer (PC), a desktop computer, a personal digital assistant (PDA), a smart phone, a smart tv or any programmable electronic device capable of communicating with mobile device 102 via network 120. Computing device 110 includes and enables shared storage 106, which executes locally on computing device 110. Shared storage 106 can be a data repository that may be written to and read by one or combination of metadata program 104, sensing technologies 130, camera application 112, and one or more computing devices, such as computing device 110, or other computing devices (not shown), connected via network 120. Photographs and associated metadata may be stored on shared storage 106 housed within computing device 110 and/or local storage 108 housed within mobile device 102. Further, micro-location information may be stored on shared storage 106. In some embodiments, shared storage 106 may be written to and read by programs and entities outside of computing environment 100 in order to populate the repository with data corresponding to the location, micro-locations, or events occurring at the location.

In various embodiments of the present invention, sensing technologies 130 are wireless computing devices capable of communicating via network 120. In some embodiments, sensing technologies 130 communicate with mobile device 102 via a Bluetooth® network. For example, in some embodiments, sensing technologies 130 send out intermittent signals that can be received by Bluetooth® enabled devices. In some examples, the signals include an identification tag for beacon 130a and or beacon 130n. In another example, the signal includes the micro-location of beacon 130a and or beacon 130n. In another embodiment, sensing technologies 130 communicate with mobile device 102 via a wireless internet network (i.e., Wi-Fi) and or via satellite communication service (i.e., Cellular Service). In some embodiments, sensing technologies 130 transmits an identification tag or a micro-location to a device that is connected to the Wi-Fi network. In some embodiments, sensing technologies 130 determine and transmit a micro-location to mobile device 102. For example, beacon 130a and beacon 130n communicate identification tags corresponding to a micro-location (e.g., a row and seat number in a stadium) based on the proximity of mobile device 102.

In some embodiments, mobile device 102 communicates the location received from sensing technologies 130 to metadata program 104 to populate location-specific metadata for a photograph. In various embodiments, sensing technologies 130 are placed throughout a venue. A venue can be any location area capable of being defined by multiple micro-locations. Example venues include, but are not limited to, a stadium, a store, a park, a mall, a museum, a theatre, etc. Metadata searching program 105 enables a user and or owner of sensing technologies 130 to conduct a metadata search. The metadata search can be a local, regional, nationwide, global, and or any combination thereof. In some embodiments, metadata searching program 105 can search a series of mobile devices for metadata that fits the key words submitted into the metadata search.

In some embodiments, sensing technologies 130 can be paired with a service that enables an operator (i.e., a venue) to record the location of the sensing technologies (e.g., on a map or a floor plan). In some embodiments, beacon operators can assign messages or data to each respective beacon of sensing technologies 130, using the service. In some embodiments, messages or data assigned to sensing technologies 130 are populated in the metadata of a photograph, in response to a user taking a photograph within range of sensing technologies 130.

Figure 2:
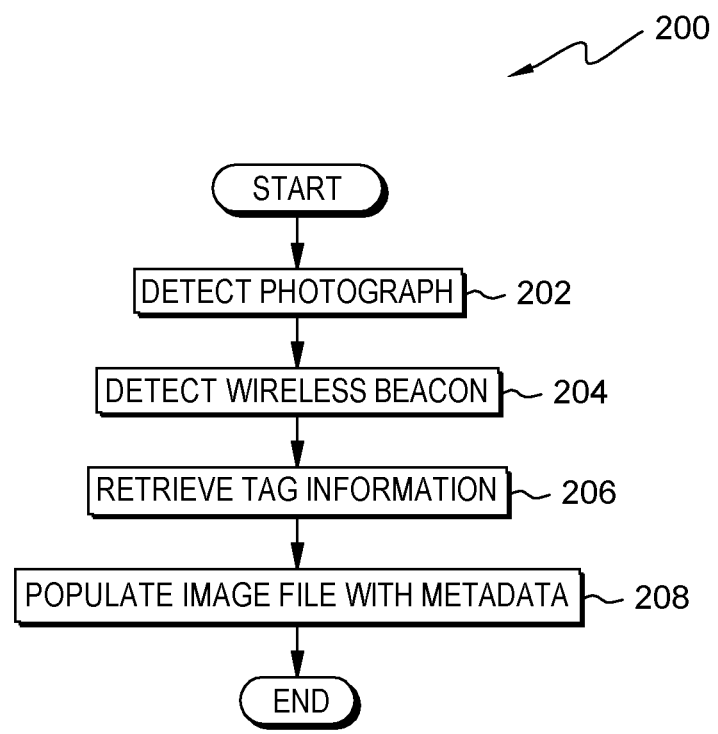
FIG. 2 is a flowchart depicting operations for adding micro-location metadata to a photograph, on a computing device within the computing environment of FIG. 1, in accordance with an embodiment of the present invention.

FIG. 2 depicts flowchart 200, which includes operations for adding micro-location metadata to a photograph, on a computing device within the computing environment of FIG. 1, in accordance with an embodiment of the present invention. For example, flowchart 200 depicts operations of metadata program 104, on mobile device 102 within computing environment 100.

In step 202, metadata program 104 detects a photograph created by mobile device 102. In some embodiments, a photograph is taken by camera application 112 on mobile device 102. In some embodiments, metadata program 104 automatically detects an image. In another embodiment, metadata program 104 receives a notification from camera application 112 that a photograph has been taken. In some embodiments, camera application 112 sends metadata program 104 a notification after each photograph is taken. In another embodiment, camera application 112 sends metadata program 104 a notification in response to a user action (e.g., a user interaction with user interface 114). For example, a user can select whether a photograph is populated with metadata corresponding to the micro-location.

In step 204, metadata program 104 determines a wireless beacon. For example, mobile device 102 receives a signal from a beacon through a network (e.g., Bluetooth® or Wi-Fi or Cellular Service). Metadata program 104 determines whether mobile device 102 is within range of a beacon. In some embodiments, sensing technologies 130 communicate via a network. In some embodiments, metadata program 104 will detect more than one beacon. For example, for a location that has multiple sensing technologies 130, mobile device 102 may be within range of more than one beacon. In these embodiments, metadata program 104 determines which beacon is within the closest proximity to mobile device 102 at the time the photograph was taken, based on the strength of network signal from the beacon.

Metadata program 104 collects information from sensing technologies 130, such as an identification tag, metadata, micro-location information. In some embodiments, beacon 130a and or beacon 130n identification tags allows metadata program 104 to associate shared storage information with the detected beacon or beacons. In other embodiments, beacon 130a and or beacon 130n identification tags allows metadata program 104 to associate local storage information with the detected beacon(s). In alternative embodiments, beacon 130a and or beacon 130n identification tags allows metadata program 104 to associate information from both shared storage 106 and local storage 108 with the detected beacon(s). In some embodiments, beacon 130a and or beacon 130n identification tags can be added to the metadata to allow a user to obtain more information, or more detailed information, related to the beacon, after the initial metadata is populated. For example, beacon 130a and or beacon 130n identification tags may be used to allow a user to access news related to an event at which the photograph was taken.

In some embodiments, metadata program 104 uses beacon 130a and or beacon 130n identification tags when communicating with shared storage 106 and/or local storage 108. For example, shared storage 106 is populated with information relating to each of multiple beacons (e.g., micro-location, weather, events, etc.) and metadata program 104 can access the information using beacon 130a and or beacon 130n identification tags of each of the multiple beacons. In another example, beacon 130a and or beacon 130n identification tags may be used to allow a user to access a coupon for a merchant, in which the user photographed goods in the merchant's store. In a different embodiment, metadata program 104 uses beacon 130a and or beacon 130n identification tags when communicating with local storage 108. In an alternative embodiment, metadata program 104 uses beacon 130a and or beacon 130n identification tags when communicating with both shared storage 106 and local storage 108.

In another embodiment, metadata program 104 requests the location and identification tag information for each beacon (i.e. beacon 130a and or beacon 130n) in a venue, in response to a user being within network range of multiple beacons. For example, if a user enters a venue (e.g., a stadium) and is within range of multiple sensing technologies (e.g., a plurality of beacons), metadata program 104 requests the location and identification tag information of each of the sensing technologies (beacon 130a and or beacon 130n). In such an embodiment, metadata program 104 does not have to request beacon information for each photograph, metadata program 104 can automatically tag the photographs with the beacon information. In another embodiment, metadata program 104 communicates with shared storage 106 in response to connecting to a first beacon. Metadata program 104 receives data on each beacon in the venue from shared storage 106. In some embodiments of the present invention, knowing the predetermined beacon information enables metadata program 104 to populate the photograph metadata more quickly and with fewer resources. In other embodiments, metadata program 104 uses local storage 108 and or a combination of both local storage 108 and shared storage 106.

In step 206, metadata program 104 retrieves identification tag information related to the beacon location. In some embodiments, metadata program 104 uses beacon 130a and or beacon 130n identification tags to access shared storage 106 and local storage 108, which contain information relating to a micro-location. Based on the location of the beacon, metadata program 104 retrieves relevant metadata information from shared storage 106 and or local storage 108. In some embodiments, shared storage 106 is populated by news sources, social media streams, user input, or location specific data. For example, where the user is attending a sporting event, a news source may provide information on actions that occurred at the time the photograph was taken (e.g., a homerun was hit at the same time). Further, location specific data can include the location of the user's seat (e.g., row, seat number, etc.), teams playing at the event, or name of the location. In another example, in which the user is at a store, a news source can include an advertisement (e.g., a discount for merchandise at the store). In some embodiments, a merchant may issue a promotion to the user via the metadata. For example, where a beacon places the user in a specific department (e.g., shoe department), the metadata can be populated with a discount for items located in the specific department (e.g., a percentage off on a shoe purchase). In some embodiments, the promotion metadata can be displayed on the photograph when the photograph is shared with a second user. In some embodiments, location specific data can include the aisle in which the user was located when the photograph was taken.

In step 208, metadata program 104 populates the photograph with metadata. Metadata program 104 populates the photograph with some or all of the information retrieved in step 206. In some embodiments, after populating the photographs, videos, and or images metadata program 104 stores the newly tagged photographs, videos, and or images on local storage 108 and or shared storage 106. The tagging to the photographs, videos, and or images enables an efficient and effective way to search for and organize media files (i.e., photographs, videos, and or images), and or other forms of information known in the art. In some embodiments, the information populated in the photograph metadata is based on a series of rules. In some embodiments, the rules are established by a user. For example, in a setup process of metadata program 104 on mobile device 102, the user pre-selects the type of information that is populated in the photograph metadata (e.g., weather, news, social media, location, etc.). In some embodiments, user selects from a predefined list of rules or can input a custom rule. For example, a predefined rule can state that all photographs receive micro-location metadata when a beacon is detected. In other embodiments, the rules are established by a third party, such as the case in which the rules can be established by the owner/operator of sensing technologies 130. For example, the owner/operator of the sensing technologies 130 is a merchant, a rule can be that a coupon is attached to the photograph metadata. In another embodiment, the metadata is populated in the photograph in response to a user interaction with user interface 114. For example, after the information from beacon 130a and or beacon 130n is retrieved, a user is issued a prompt which allows the user to select the information that is populated in the metadata.

Figure 3:
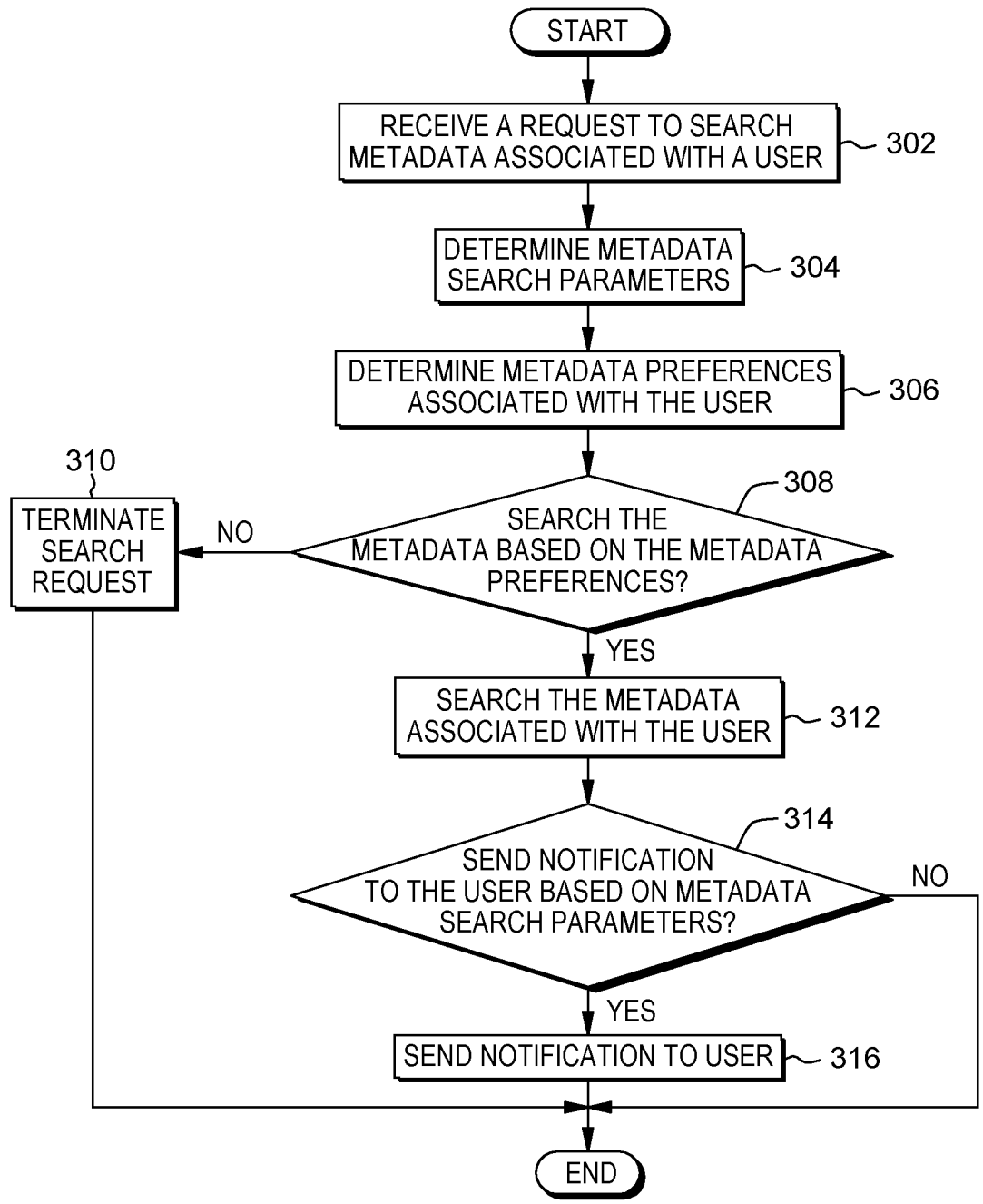
FIG. 3 is a flowchart depicting operations for searching micro-location metadata and sending notifications, on a computing device within the computing environment of FIG. 1, in accordance with an embodiment of the present invention.

FIG. 3 is a flowchart depicting operations for micro-location metadata searching and sending notifications, on a computing device within the computing environment of FIG. 1, in accordance with an embodiment of the present invention. For example, flowchart 300 depicts operations of metadata searching program 105, on sensing technologies 130 within computing environment 100.

In step 302, metadata searching program 105 receives a request to search metadata associated with a user. In this embodiment, a service provider (e.g., an event ticket provider) submits a request to search metadata associated with a user, wherein metadata searching program 105 within sensing technologies 130 receives the request to perform a metadata search. In another embodiment, metadata searching program 105 is located on a mobile device of the user (i.e., mobile device 102). In this embodiment, the metadata associated with the user is stored in local storage 108. In another embodiment, the metadata associated with the user is stored in shared storage 106. In an example, Team A is hosting an upcoming football game and an event ticket provider for Team A identifies a number of empty seats in a particular section, where the number of empty seats represents unsold tickets to the football game. The event ticket provider (i.e., service provider) for Team A decides to send a promotional offer to fans who previously attended a football game and sat in the particular section with the empty seats and sends a request to metadata searching program 105 to search for metadata in local storage 108 containing Team A metadata tags, along with micro-location information relating to the particular section, in order to fill the empty seats. In another embodiment, the user may be part of a subscription service, involved in a mobile application service, or possess metadata linking the user and a particular good or service on social media (i.e., public information). Referencing the previous example, instead of the event ticket provider conducting a nationwide and or global search of metadata for a plurality of users, the event ticket provider can search user metadata within the subscription population.

In some embodiments, metadata searching program 105 can conduct local, individual, regional, national, and or global metadata searches.

In step 304, metadata searching program 105 determines the metadata search parameters. In this embodiment, subsequent to metadata searching program 105 receiving a request to search metadata, metadata searching program 105 determines the metadata search parameters associated with the service provider to filter, or otherwise reduce the number of, metadata search results. A user of sensing technologies 130 can input key words, images, videos, and or any form of searchable data known in the art, and any combination thereof, to search metadata. In one embodiment, sensing technologies 130 can receive a plurality textual and data input from a plurality of users. Continuing from the previous example, Team A is hosting an upcoming football game, where a particular section includes empty seats with unsold tickets. The event ticket provider (i.e., service provider) decides to send a promotional offer to fans (i.e., users) who have previously sat in the particular section. The service provider then enters the desired keywords into sensing technologies 130 in order to perform a regional search. In this example, search parameters may include searching for metadata with micro-location information that includes a stadium location for Team A and more particularly, the particular section with empty seating. Additionally, the search parameters may include users who have visited the stadium and the particular section within a certain time frame (e.g., within the previous 2 years or within the previous few months) and have purchased seats similar in price (e.g., plus or minus a predetermined value) or have purchased seats higher in price in the particular section. In some embodiments, the metadata search parameters can have a minimum photo threshold, wherein the metadata search parameter must locate at least one photograph and or associated metadata in order to send a notification. For example, the metadata search parameters will not send a notification to the user unless there are at least two photographs in a particular section of the stadium.

In another embodiment, the service provider can submit a metadata search request for a particular item. For example, Store A wants to promote its upcoming Television (TV) sales event. Metadata searching program 105 receives a request from Store A to search metadata associated with users for TV related metadata, in order to effectively distribute information about the upcoming TV sales event. In this example, the metadata associated with a user relating to TV may include metadata associated with photos stored on a mobile device (e.g., mobile device 102), in cloud based storage, in a remote database (e.g., shared storage 106), in a database housed within a computing device (e.g. local storage 108), or any combination thereof. In an alternative embodiment, a service provider can submit a request to search publicly available metadata online. For example, a retail store wants to keep its prices competitive with the current retail markets and wants to do a global search on the current prices from its competitors. The service provider can request metadata searching program 105 to search the publicly accessible internet for metadata concerning the current sales price for a set number of goods.

Subsequent to metadata searching program 105 receiving a request to search metadata, metadata searching program 105 may determine the search parameters. In some embodiments, metadata searching program 105 communicates with metadata program 104 via network 120 in order to access the metadata stored on mobile device 102. Continuing from the previous example, Store A submits a metadata search request for TV's ranging in size from 32 inches to 50 inches, by entering keyword search terms "TV and "32 inches to 50 inches." In other embodiments, Boolean operators can be different and range in complexity. In one embodiment, once metadata searching program 105 receives the search parameters metadata searching program 105 can direct metadata program 104 to search through metadata associated with users for anything pertaining to TV's ranging in size from 32 inches to 50 inches. In other embodiments, metadata searching program 105 directs metadata program 104 to search through metadata associated with a user on mobile device 102, and computing device 110 based on the search parameters. In different embodiment, metadata searching program 105 directs metadata program 104 to search through metadata associated with a user on mobile device 102 based on the search parameters, while metadata searching program 105 access and searches computing device 110 for metadata associated with a user based on the search parameters. In other embodiments, when metadata searching program 105 interacts with metadata program 104, metadata searching program 105 can communicate, translate, instruct, delegate, command, override, and/or perform any other form of communication between programs known in the art with metadata program 104. Metadata associated with a user may be, but is not limited to, media files, tags, geo-locations, and micro-locations. The media files may be images, pictures or videos taken by the user at other department stores, at home or any other locations that may fit the search parameters that metadata searching program 105 receives. The media file may also include pictures or videos downloaded by the user from the internet or department store websites. Images and media files may also contain tags that help label the image. For example, a user takes a photo of a TV at an electronics store and tags the photo with the size of the TV, the brand of the TV, and the location of the electronic store. In this particular example, the size of the TV is 50 inches, supplied by Brand A, and the location is an electronic store in Los Angeles.

In step 306, metadata searching program 105 determines metadata preferences associated with the user. In this particular embodiment, metadata searching program 105 receives and determines the metadata search parameters but, prior to metadata searching program 105 accessing metadata associated with a user, metadata searching program 105 determines whether the metadata preferences associated with the user grants metadata searching program 105 access to the metadata. In some embodiments, metadata program 104 can communicate the user's metadata preferences to metadata searching program 105 and indicate whether to disable or enable access to a user's metadata based on the set metadata preferences. The metadata preferences associated with the user allows the user to restrict or enable metadata searching program 105 access to the user's metadata. Generally, in various embodiments, a user can manipulate the metadata preferences to adjust metadata accessibility on mobile device 102. In one embodiment, the user can access the metadata preferences through user interface 114 within mobile device 102, through touch screen, touch tone settings, or voice settings or any combination thereof. For example, a shoe department store wants to advertise a promotional sale. The service provider (i.e., the shoe department store) sends a request to metadata searching program 105 to search for user metadata pertaining to shoes. However, if the user selects to restrict the sharing of metadata, then metadata program 104 would not grant metadata searching program 105 access to view and or search the metadata associated with the user.

Alternatively, if the user's metadata preferences enable metadata searching program 105 to access metadata associated with the user, then metadata program 104 will not prohibit metadata searching program 105 access, and the metadata associated with the user would be searchable to metadata searching program 105. In another embodiment, the user preferences can be based off promotional subscriptions to companies or websites. In alternative embodiments, a user can select to restrict all metadata, or selected portions of metadata or any combination thereof. For example, a user can select to restrict all metadata prior to the year 2016. In another embodiment, a user can select to restrict or enable specific content and or topics. For example, a user can select to share metadata for anything sports related and restrict access to everything else. In an alternative embodiment, the metadata preferences can be made in real time. For example, prior to beginning the metadata search, metadata searching program 105 prompts a request to user, requesting access to search metadata associated with the user. The request can be in the form of a text, an email, a phone call, a message within an application, or a pop-up message on user interface 114, for example. In some embodiments, metadata searching program 105 search request triggers metadata program 104 to prompt a request to user, requesting access to search metadata associated with the user.

In step 308, metadata searching program 105 determines whether to search the metadata based on the metadata preferences associated with the user's metadata preferences. In various embodiments, metadata searching program 105 is responsive to the metadata preferences. In the event metadata searching program 105 determines it is not enabled to search the metadata based on the metadata preferences associated with the user ("no" branch, 308), metadata searching program 105 does not access the metadata associated with the user and terminates the search (310), resulting in the user being exclude from the search. For example, if a user selects to restrict access to all metadata for mobile device 102, metadata searching program 105 cannot access a metadata associated with photographs from mobile device 102 associated with the particular user, metadata searching program 105 terminates the search request, and the user will be excluded from the search. In the event metadata searching program 105 determines to search the metadata based on the metadata preferences associated with the user ("yes" branch, 308), metadata searching program 105 performs the search and accesses the metadata associated with the user (312). For example, if a user selects to enable access to metadata on mobile device 102, metadata searching program 105 can access the metadata associated with the user and conduct the metadata search based on the metadata search parameters determined in step 304.

In step 310, metadata searching program 105 terminates the search request. In the event the user selects to prevent the sharing of metadata via the metadata preferences associated with the user, metadata searching program 105 terminates the search request and excludes the user from the search, and metadata searching program 105 ends. For example, a hardware store wants to distribute advertisement for their upcoming promotional deal and elects to submit a nationwide metadata search pertaining to hardware. However, if the user selects to restrict metadata searching program 105 from accessing metadata on mobile device 102, metadata searching program 105 excludes the user from the metadata search and does not search the metadata in local storage 108 on mobile device 102. In another embodiment, if the user selects to restrict metadata searching program 105 from accessing all metadata associated with the user, metadata searching program 105 excludes the user from the metadata search and does not search the metadata in shared storage 106 on computing device 110, or local storage 108 on mobile device 102.

In step 312, metadata searching program 105 searches the metadata associated with the user. If the metadata preferences associated with the user enable metadata searching program 105 to access all the user's metadata, then metadata searching program 105 initializes the search of metadata on local storage 108, shared storage 106, camera application 112, or any combination thereof. In an example, a department store wants to send promotional deals to customers for the upcoming holiday season. The department store decides to conduct a metadata search for users who have metadata pertaining to Christmas related items. In this particular example, if the user preferences enable metadata searching program 105 to search the user's metadata, then metadata searching program 105 can search the user's metadata for Christmas related metadata. For example, metadata searching program 105 can search for micro-location information of the metadata, where the micro-location information includes the Rockefeller Center between the months of November and January.

In step 314, metadata searching program 105 determines whether to send a notification to the user based on metadata search parameters. In this particular embodiment, in the event metadata searching program 105 determines that some of the user's metadata matches the proposed search parameters ("yes" branch, 314) then, metadata searching program 105 sends a notification to mobile device 102 (318). In the event metadata searching program 105 determines the user's accessible metadata does not match the metadata search parameters ("no" branch, 314) metadata searching program 105 does not send a notification, and metadata searching program 105 ends.

In one embodiment, the service provider can conduct a user metadata search and instruct metadata searching program 105 to postpone sending the notification to users by presetting a notification release date. Metadata searching program 105 determines that there is no metadata associated with the user matching the submitted metadata search parameters. For example, a service provider submits a metadata search to locate user metadata pertaining to dress shoes and or heels. If the user's metadata preferences enable metadata searching program 105 to access their user metadata, metadata searching program 105 will search the user's local storage 108 within mobile device 102 for metadata content matching the metadata search parameters. If metadata searching program 105 does not find any matching user metadata concerning dress shoes or heels, metadata searching program 105 does not send a notification to the user. In a different embodiment, metadata searching program 105 can search shared storage 106 (i.e. cloud based storage) for metadata.

In step 316, metadata searching program 105 sends a notification to a user. In this particular embodiment, subsequent to metadata searching program 105 determining a portion or all of the user's metadata matches the metadata search parameters, metadata searching program 105 sends a notification to the user. For example, a department store wants to send promotional deals to customers for the upcoming holiday season. The department store decides to conduct a metadata search for users who have metadata pertaining to Halloween related items. In this particular example, if the user preferences enable metadata searching program 105 to search the user's metadata, then metadata searching program 105 searches the user's metadata for Halloween related metadata, and distributes the promotional material, via mobile device 102, to the user whose metadata matched the search parameters. Metadata searching program 105 can send the notification (i.e., targeted notification) to a user via email, text, or any other form of electronic communication known in the art. In an alternative embodiment, the user can receive a pop-up message on user interface 114 within mobile device 102, requesting the user to accept or reject the notification. In this particular embodiment notification can be any form or advertisement, promotional, and or marketing strategy known in the art. Embodiments of the present invention may include, but are not limited to sending notification that refer to security warnings, weather alerts, amber alerts, brush fire warnings, price alerts, food recalls, car recalls, airline check in, flight alerts, or other type of promotional, informational, or warning known in the art. In a different embodiment, metadata searching program 105 can send notifications to users incrementally as the metadata search progress and or send the notification to the all the users simultaneously once the metadata search is completed.

Figure 4:
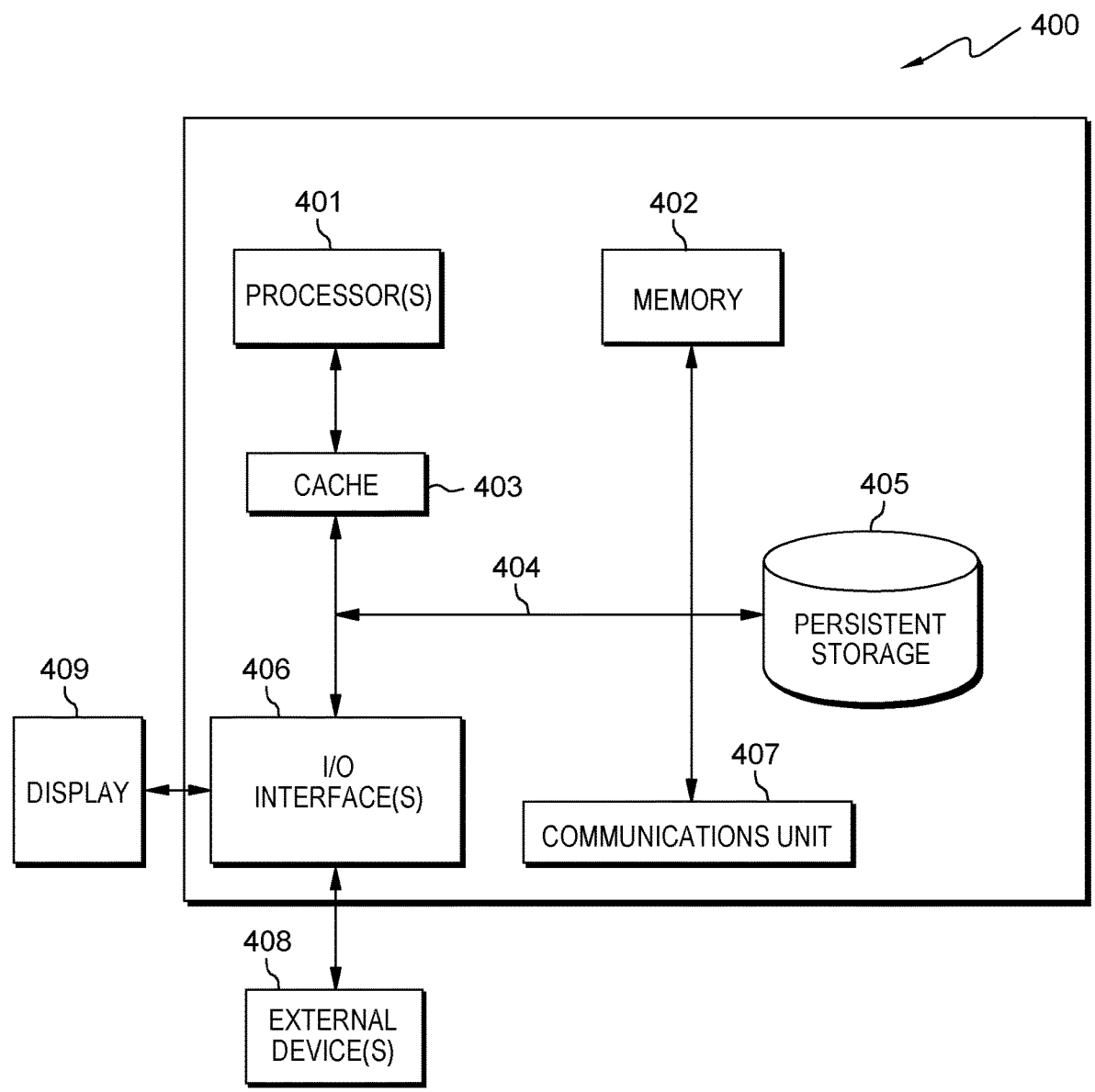
FIG. 4 is a block diagram of components of a computing device capable of executing operations for adding micro-location metadata to a photograph, in accordance with an embodiment of the present invention.

FIG. 4 depicts a block diagram of components of a computing device within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

FIG. 4 depicts computer system 400, where server computer 102 represents an example of computer system 400 that includes time zone notification program 110. The computer system includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 enables for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
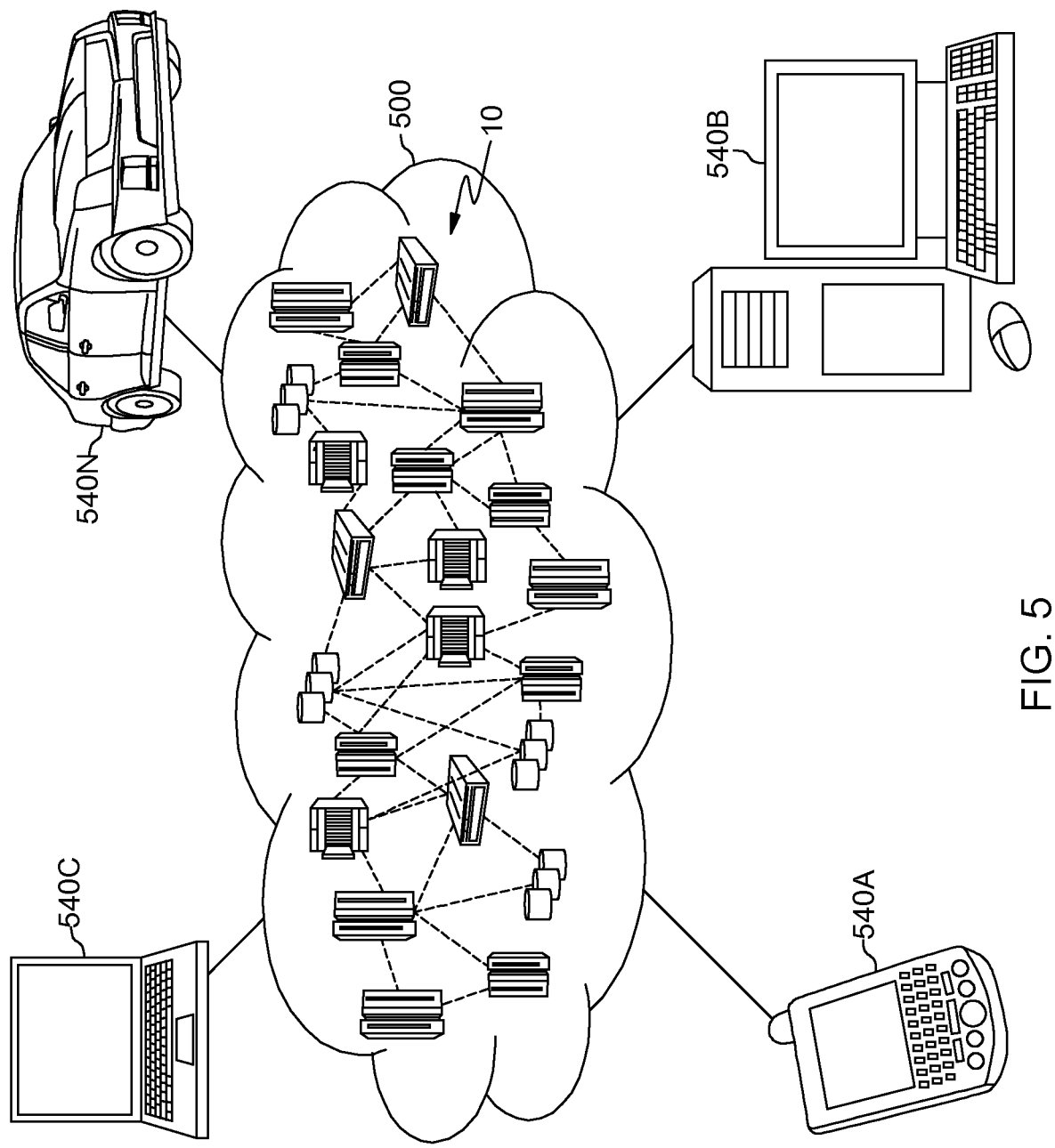
FIG. 5 depicts a cloud computing environment according to an embodiment of the present invention.

Referring now to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 540A, desktop computer 540B, laptop computer 540C, and/or automobile computer system 540N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 1 are intended to be illustrative only and that computing nodes 10 and cloud computing environment 500 can communicate with any type of computerized device over any type of network and/or network addressable connection (e.g., using a web browser).

Figure 6:
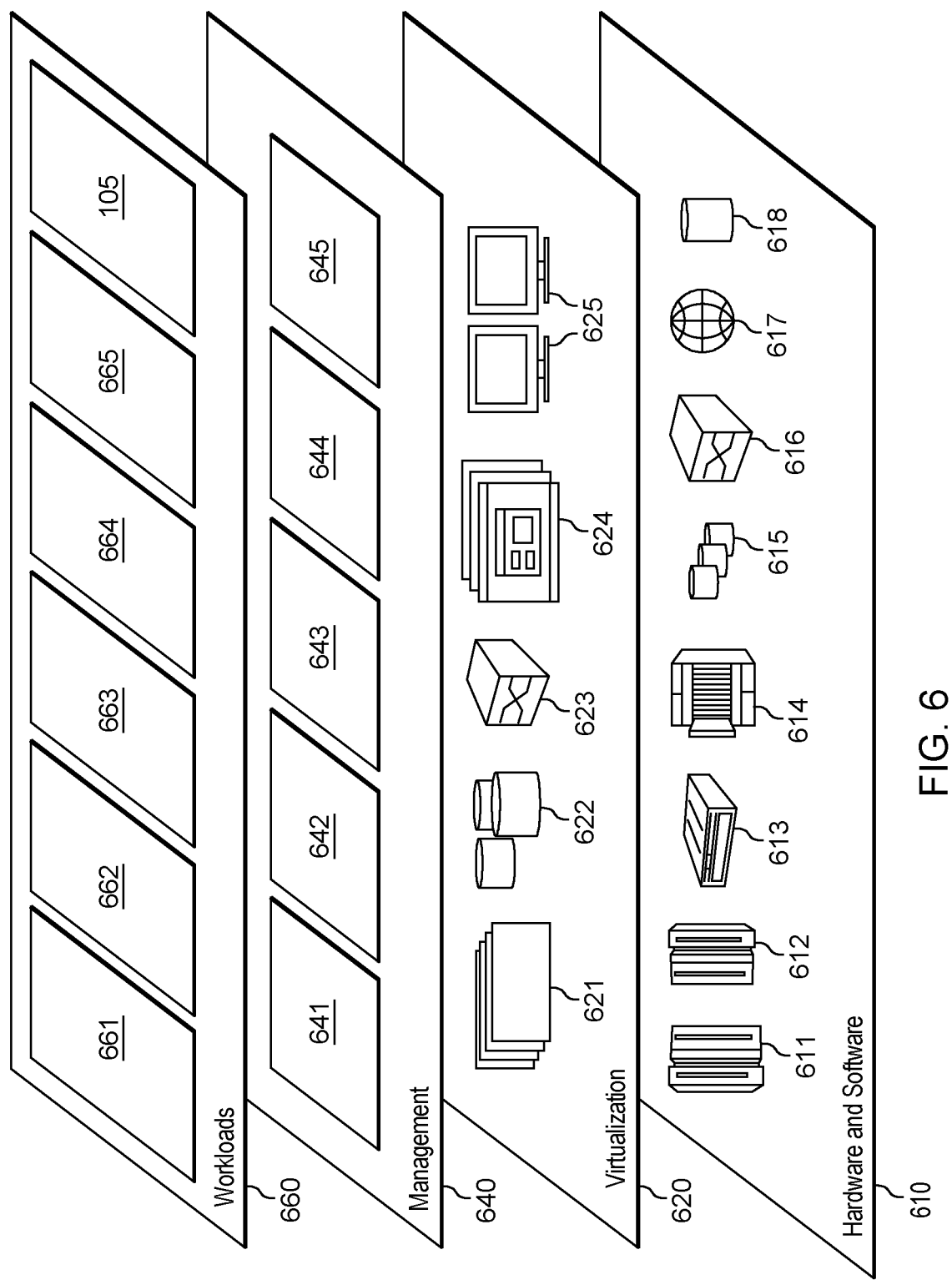
FIG. 6 depicts abstraction model layers of the cloud computing environment in accordance with an embodiment of the present invention.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 610 includes hardware and software components. Examples of hardware components include: mainframes 611; RISC (Reduced Instruction Set Computer) architecture based servers 612; servers 613; blade servers 614; storage devices 615; and networks and networking components 616. In some embodiments, software components include network application server software 617 and database software 618 which can be an identity management application (e.g., VMM). It should be noted that the term "database software 68" can herein be used interchangeably with "identity management application 68".

Virtualization layer 620 provides an abstraction layer from which the following examples of virtual entities may be provided: virtual servers 621; virtual storage 622; virtual networks 623, including virtual private networks; virtual applications and/or operating systems 624; and virtual clients 625.

In one example, management layer 640 may provide the functions described below. Resource provisioning 641 provides dynamic procurement of computing resources and other resources that are utilized to perform tasks within the cloud computing environment. Metering and Pricing 642 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 643 provides access to the cloud computing environment for consumers and system administrators. Service level management 644 provides cloud computing resource allocation and management such that required service levels are met. Service Level Agreement (SLA) planning and fulfillment 645 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 661; software development and lifecycle management 662; virtual classroom education delivery 663; data analytics processing 664; transaction processing 665 and metadata searching program 105.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a request to search metadata associated with a first user, wherein the request includes metadata search parameters including an event venue, a seating section within the event venue, and a first scheduled event that occurred at the event venue;
   determining, by one or more processors, whether a portion of metadata of a media file associated with the first user matches a portion of the metadata search parameters;
   identifying, by one or more processors, a targeted notification based at least on the portion of the metadata of the media file associated with the first user matching the portion of the metadata search parameters, wherein the targeted notification includes an offer to obtain a ticket to attend a second scheduled event at the event venue in the seating section, wherein the second scheduled event is similar to the first scheduled event, and wherein the second scheduled event occurs at a different time than the first scheduled event; and
   sending, by one or more processors, the targeted notification to an electronic device corresponding to the first user.

2. The method of claim 1, further comprising:
   determining, by one or more processors, metadata preferences associated with the first user, wherein the metadata preferences associated with the first user include at least an indication of accessibility of the metadata of the media file; and
   responsive to identifying the metadata preferences associated with the first user include an indication allowing access to the metadata of the media file, determining, by one or more processors, whether the metadata of the media file matches the metadata search parameters.

3. The method of claim 2, wherein the indication of accessibility of the metadata of the media file is determined in real time by prompting the first user upon receiving the request.

4. The method of claim 1, wherein the portion of the metadata of the media file associated with the first user matching the portion of the metadata search parameters includes at least: an event type, the event venue, and the seating section within the event venue.

5. The method of claim 2, further comprising:
   accessing, by one or more processors, a storage device located on the electronic device associated with the first user to search for metadata associated with the media file.

6. The method of claim 1, wherein the targeted notification is a targeted advertisement to purchase the ticket at a discount.

7. A computer program product comprising:
   one or more computer readable storage devices and program instructions stored on the one or more computer readable storage devices, the stored program instructions comprising:
   program instructions to receive a request to search metadata associated with a first user, wherein the request includes metadata search parameters including an event venue, a seating section within the event venue, and a first scheduled event that occurred at the event venue;
   program instructions to determine a portion of metadata of a media file associated with the first user matches a portion of the metadata search parameters;
   program instructions to identify a targeted notification to send the first user based at least on the portion of the metadata of the media file associated with the first user matching the portion of the metadata search parameters, wherein the targeted notification includes an offer to obtain a ticket to attend a second scheduled event at the event venue in the seating section, wherein the second scheduled event is similar to the first scheduled event, and wherein the second scheduled event occurs at a different time than the first scheduled event; and
   program instructions to send the targeted notification to the first user, wherein the targeted notification is viewable on an electronic device associated with the first user.

8. The computer program product of claim 7, the stored program instructions further comprising:
   program instructions to determine metadata preferences associated with the first user, wherein the metadata preferences associated with the first user include at least an indication of accessibility of the metadata of the media file; and
   program instructions to respond to identifying the metadata preferences associated with the first user include an indication allowing access to the metadata of the media file by determining whether the metadata of the media file matches the metadata search parameters.

9. The computer program product of claim 8, wherein the indication of accessibility of the metadata of the media file is determined in real time by prompting the first user upon receiving the request.

10. The computer program product of claim 7, wherein the portion of the metadata of the media file associated with the first user matching the portion of the metadata search parameters includes at least: an event type, the event venue, and the seating section within the event venue.

11. The computer program product of claim 8, the stored program instructions further comprising:
    program instructions to access a storage device located on the electronic device associated with the first user to search for metadata associated with the media file.

12. The computer program product of claim 7, wherein the targeted notification is a targeted advertisement to purchase the ticket at a discount.

13. A computer system comprising:
    one or more computer processors;
    one or more computer readable storage devices;
    program instructions stored on the one or more computer readable storage devices for execution by at least one of the one or more computer processors, the stored program instructions comprising:

program instructions to receive a request to search metadata associated with a first user, wherein the request includes metadata search parameters including an event venue, a seating section within the event venue, and a first scheduled event that occurred at the event venue;

program instructions to determine a portion of metadata of a media file associated with the first user matches a portion of the metadata search parameters;

program instructions to identify a targeted notification to send the first user based at least on the portion of the metadata of the media file associated with the first user matching the portion of the metadata search parameters, wherein the targeted notification includes an offer to obtain a ticket to attend a second scheduled event at the event venue in the seating section, wherein the second scheduled event is similar to the first scheduled event, and wherein the second scheduled event occurs at a different time than the first scheduled event; and program instructions to send the targeted notification to the first user, wherein the targeted notification is viewable on an electronic device associated with the first user.

14. The computer system of claim 13, the stored program instructions further comprising program instructions to:

determine metadata preferences associated with the first user, wherein the metadata preferences associated with the first user include at least an indication of accessibility of the metadata of the media file; and respond to identifying the metadata preferences associated with the first user include an indication allowing access to the metadata of the media file by determining-whether the metadata of the media file matches the metadata search parameters.

15. The computer system of claim 14, wherein the indication of accessibility of the metadata of the media file is determined in real time by prompting the first user upon receiving the request.

16. The computer system of claim 13, wherein the portion of the metadata of the media file associated with the first user matching the portion of the metadata search parameters includes at least: an event type, the event venue, and the seating section within the event venue.

17. The computer system of claim 14, the stored program instructions further comprising program instructions to:

access a storage device located on the electronic device associated with the first user to search for metadata associated with the media file.

18. The method of claim 2, wherein the indication of accessibility identifies one or more topics of the metadata that are permitted to be accessed and one or more additional topics of the metadata that are restricted from being accessed.

19. The method of claim 18, wherein the one or more additional topics include at least one topic based on date.

20. The method of claim 1, wherein the metadata search parameters further include a minimum photo threshold, and wherein determining whether the metadata of the media file associated with the first user matches the portion of the metadata search parameters includes determining that the first user has a threshold number of photos with metadata matching the event venue and seating section of the metadata search parameters.

* * * * *